United States Patent [19]

Lankamp

[11] Patent Number: 4,919,550
[45] Date of Patent: Apr. 24, 1990

[54] BEARING ASSEMBLY

[75] Inventor: Herman Lankamp, Bunnik, Netherlands

[73] Assignee: SKF Industrial Trading & Development Company, B.V., Vinbann, Netherlands Antilles

[21] Appl. No.: 260,405

[22] Filed: Oct. 20, 1988

Related U.S. Application Data

[63] Continuation-in-part of Ser. No. 92,122, Sep. 2, 1987, abandoned.

[30] Foreign Application Priority Data

Sep. 16, 1986 [NL] Netherlands .......................... 8602343

[51] Int. Cl.⁵ ............................................ F16C 33/82
[52] U.S. Cl. .................... 384/133; 384/478; 277/80
[58] Field of Search ............... 384/133, 446, 397, 478, 384/100; 277/80

[56] References Cited

U.S. PATENT DOCUMENTS 4,526,484 7/1985 Stahl et al. ..................... 384/397

FOREIGN PATENT DOCUMENTS 2058953 4/1981 United Kingdom .

Primary Examiner—Lenard A. Footland
Attorney, Agent, or Firm—Eugene E. Renz, Jr.

[57] ABSTRACT

Bearing assembly, in particular for an electric motor of a household appliance, which has a bearing sleeve of a synthetic material forming the running surface of the bearing, a shaft mounted in said sleeve, and a lubricant between the running surface of the sleeve and the shaft. The bearing sleeve consists of a synthetic material in which particles of a magnetic material are imbedded. The lubricant is a magnetic lubricant of which so small a quantity is present between the shaft and the running surface of the bearing sleeve that the lubricant forms an annular film of small axial breadth relative to the axial dimension of the sleeve.

1 Claim, 1 Drawing Sheet

BEARING ASSEMBLY

This invention is a continuation-in-part of Ser. No. 07/092,122 filed Sept. 2, 1987 and entitled BEARING ASSEMBLY.

FIELD OF THE INVENTION

The invention relates to a bearing assembly, in particular for an electric motor of a household appliance, comprising a bearing sleeve of a synthetic material forming the running surface of the bearing, a shaft mounted in said sleeve, and a lubricant between the running surface of the sleeve and the shaft, means being provided to retain said lubricant. Such a bearing assembly is generally known in the art.

BACKGROUND OF THE INVENTION

Electric motors for household appliances should run as quietly as possible, which means, among other things, that the bearings must function optimally. An important condition for this is that the bearings must be well lubricated.

In the known bearing assembly, the running surface of the sleeve is provided with one or more grooves to retain the lubricant. It has been found, however, the environmental influences, such as comparatively high temperatures in the appliance, will cause the lubricant to drain along the shaft out of the grooves of the bearing, so that the sleeve and the electric motor suffer premature wear, resulting in an unacceptably high noise level or worse.

The object of the invention is to provide a bearing assembly of the type defined above in which the lubricant will be retained essentially for an indefinite period, and at the same time to provide an economically advantageous bearing by virtue of its form and construction.

SUMMARY OF THE INVENTION

This object is accomplished in that, in the bearing assembly according to the invention, the bearing sleeve consists of a synthetic material in which particles of a magnetic material are imbedded, and the lubricant is a magnetic lubricant, of which so small a quantity is present between the shaft and the running surface of the sleeve that the lubricant forms an annular film of small axial breadth relative to the axial dimension of the sleeve.

In a bearing so constructed, the magnetic lubricant is very effectively retained by the magnetic flux created by the magnetic particles imbedded in the sleeve, the magnetic flux being prevented from escaping outside the sleeve because the force of attraction is greater towards the shaft than towards the surroundings of the sleeve. Furthermore, the bearing is less expensive than the known bearing, which requires an additional operation to produce the grooves.

Preferably the particles imbedded in the bearing sleeve consist of magnetite. Use of magnetic particles suspended in a synthetic material creates a greater force of attraction between the sleeve, shaft, and magnetic lubricant, thereby retaining the lubricant for an essentially indefinite period. Therefore, the present bearing arrangement is less expensive than the known bearing because of the improvement in lubrication.

It is noted that a magnetic lubricant is known per se. It consists of a colloidal dispersion of extremely fine particles of a magnetic material in a liquid.

British Patent No. 2,058,953 discloses a bearing assembly employing a magnetic lubricant secured between the running surface of the bearing sleeve and the shaft lodged therein by a magnetic field set up by the sleeve. Here, however, the sleeve consists of a metal or alloy capable of being magnetized to become a permanent magnet. Besides, the bearing sleeve is composed of a plurality of segments each magnetized separately.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
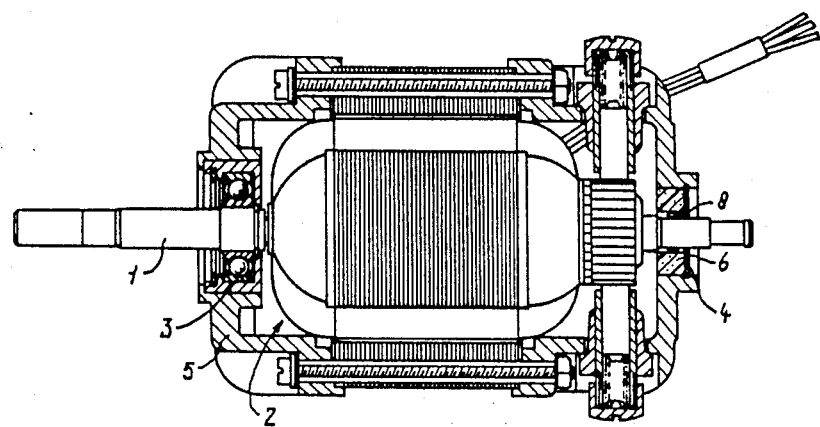
FIG. 1 shows an axial section of an electric motor of a household appliance with a bearing assembly according to the invention.

As shown in the drawing, the shaft 1 of the rotor of an electric motor 2 is mounted at one end by a ball bearing 3 and at the other end by a journal bearing 4 in a housing 5.

Figure 2:
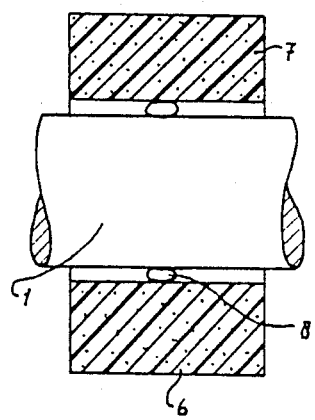
FIG. 2 shows the bearing assembly drawn to a larger scale.

The journal bearing 4 comprises a bushing 6 of a synthetic material in which particles 7 of a magnetic material are imbedded. Between the shaft 1 and the bushing 6, a drop of magnetic lubricant 8 is introduced, which owing to the magnetic field set up by the magnetic particles 7 is formed into an annular film around the shaft 1. Note that in FIG. 2, the thickness of the lubricant film 8 has been much exaggerated. In actual practice, the amount of file is reduced by a significant factor because the entire sleeve is not magnetic but only the particles imbedded therein.

The invention has certain advantages which are of significant value and which are unexpected. The magnetic field is controlled by the location of the magnetic particles in the synthetic sleeve. The sleeve itself is not magnetic but only contains that amount of magnetic particles necessary to development a magnetic flux relationship between the particles themselves and the shaft upon which the sleeve is mounted. Because of this, the force of attraction is much greater towards the shaft than it is towards the surroundings of the sleeve. These surroundings, bushings, housings and other metallic elements detract from the magnetic flux created by prior art metallic sleeves, thereby allowing the magnetic lubricant to migrate away from the shaft and lose its effectiveness as a lubricant. In addition, the presence of a synthetic sleeve prevents metal to metal contact and therefore substantially reduces the noise generated during operation.

The magnetic particles which are embedded in the synthetic sleeve reinforce the magnetic coupling between the embedded particles, the magnetic lubricant, and the metallic shaft which itself can obtain temporary magnetic properties during the operation of the device. Because the magnetic field is not sufficient to turn the entire sleeve into a permanent magnet, the sleeve which is not magnetized forms a barrier between the magnetic lubricant and the environment so that the liquid magnetic lubricant is magnetically aligned with the shaft with which it is in contact.

A further advantage of the present invention exists in using magnetic particles suspended in a synthetic material. Use of magnetic particles (7) creates a greater force of attraction between the magnetic lubricant (8), the shaft (1) and the bushing (6), thereby retaining the lubricant (8) for an essentially indefinite period. Thus, an inexpensive improvement in lubrication of such a bearing arrangement is obtained.

What is claimed is:

1. The combination of an electric motor having a housing and a shaft rotatably mounted in the housing and a bearing means for rotatably supporting the shaft comprising means defining a bearing sleeve made predominantly of a non-magnetic synthetic material circumscribing the shaft and forming the running surface of the bearing and a small quantity of lubricant film between the running surface of the sleeve and the shaft, means for retaining the lubricant comprising magnetic means consisting of particles of magnetic material embedded in the sleeve in a predetermined array so that the force of attraction for the lubricant is greater at the shaft than in the magnetically permeable environment structure surrounding the sleeve, whereby a lubricant film of relatively small axial width relative to the width of the sleeve is supported in place and the sleeve forms a barrier between the lubricant and the outside environment tending to influence the lubricant.

* * * * *